(12) United States Patent
Kang

(10) Patent No.: US 12,345,811 B2
(45) Date of Patent: Jul. 1, 2025

(54) SYSTEM AND METHOD FOR OBJECT DETECTING USING ULTRASONIC SENSOR

(71) Applicant: HL Klemove Corp., Incheon (KR)

(72) Inventor: Taeseok Kang, Suwon (KR)

(73) Assignee: HL KLEMOVE CORP., Incheon (KR)

( * ) Notice: Subject to any disclaimer, the term of this patent is extended or adjusted under 35 U.S.C. 154(b) by 101 days.

(21) Appl. No.: 18/297,119

(22) Filed: Apr. 7, 2023

(65) Prior Publication Data

US 2023/0400573 A1    Dec. 14, 2023

(30) Foreign Application Priority Data

Jun. 9, 2022    (KR) .................. 10-2022-0069926

(51) Int. Cl.
*G01S 15/931*    (2020.01)

(52) U.S. Cl.
CPC .................. *G01S 15/931* (2013.01)

(58) Field of Classification Search
USPC .. 340/426.25, 447, 467, 488, 539.1, 539.22, 340/553, 552, 588, 691.2, 693.8, 10.52
See application file for complete search history.

(56) References Cited

U.S. PATENT DOCUMENTS

| | | | | |
|---|---|---|---|---|
| 2006/0215738 A1* | 9/2006 | Kokkonen | ........... | H04B 1/7117 |
| | | | | 375/E1.032 |
| 2008/0263012 A1* | 10/2008 | Jones | ..................... | G06V 20/40 |
| 2010/0121480 A1* | 5/2010 | Stelzer | ................. | G06Q 10/087 |
| | | | | 700/229 |
| 2015/0350639 A1* | 12/2015 | Maule | ................... | G06F 3/0481 |
| | | | | 348/187 |
| 2018/0068431 A1* | 3/2018 | Takeda | ....................... | G06T 7/74 |
| 2019/0299877 A1* | 10/2019 | Saito | ....................... | B60R 11/04 |
| 2020/0250836 A1* | 8/2020 | Li | .............................. | G06T 5/30 |

\* cited by examiner

*Primary Examiner* — Daniel Previl
(74) *Attorney, Agent, or Firm* — Harvest IP Law, LLP (57) ABSTRACT

The document disclosure relates to a system and method for detecting an object using an ultrasonic sensor, and includes an ultrasonic sensor configured to transmit ultrasonic waves to an outside of a vehicle, and an electronic device configured to insert a detection sequence for detecting at least one first object into a first time code to be performed after a current time point among a plurality of time codes constituting a predetermined time code set for transmitting ultrasonic waves, and detect the at least one first object located outside the vehicle based on detecting data received from the ultrasonic sensor according to the detection sequence. Other embodiments can be applied.

20 Claims, 5 Drawing Sheets

SYSTEM AND METHOD FOR OBJECT DETECTING USING ULTRASONIC SENSOR

TECHNICAL FIELD

The present disclosure relates to a system and method for detecting an object using an ultrasonic sensor.

BACKGROUND

Recently, as safety and convenience functions for drivers such as autonomous emergency braking (AEB), a smart cruise control (SCC), a parking assist, and automated parking or the like have been increased, a sensor for recognizing a situation around a vehicle has been actively developed. To this end, a sensor attached to a vehicle includes an image sensor, a lidar sensor, a radar sensor, and an ultrasonic sensor.

Among them, the ultrasonic sensor is the simplest method of sensing a situation around a vehicle, that is, an object, and uses a method of comparing a preset threshold value with detecting data obtained from the ultrasonic sensor. In this regard, conventionally, attempts have been made to improve the performance of ultrasonic sensors through methods such as easily controlling a threshold value by using a digital module, correcting a threshold value according to temperature, or applying a variable threshold value according to time to each sensor.

However, in the case of the related art, problems occur such as signal interference due to an external environment, shortage of maximum detection distance, deterioration in object detection continuity, and initial object detection time delay.

SUMMARY

Technical Problem

Embodiments of the present disclosure provide an object detection system and method using an ultrasonic sensor capable of expanding a detection area of an ultrasonic sensor without deterioration of a detection continuity of an object and a delay of an initial object detection time.

Technical Solution

An object detection system according to an embodiment of the present disclosure include a plurality of ultrasonic sensors comprising a transmitter and a receiver and each having a detection area; and an electronic device comprising a controller configured to process data, and a communication unit configured to perform data communication; wherein the ultrasonic sensor is configured to transmit ultrasonic waves to an outside of a vehicle, and the electronic device is configured to insert a detection sequence for detecting at least one first object into a first time code to be performed after a current time point among a plurality of time codes constituting a predetermined time code set for transmitting ultrasonic waves, and detect the at least one first object located outside the vehicle based on detecting data received from the ultrasonic sensor according to the detection sequence.

In addition, the electronic device is configured to detect at least one second object located farther than the first object based on detecting data received from the ultrasonic sensor.

In addition, the electronic device is configured to change the first time code if an operation time allocated to the first time code is equal to or greater than a threshold time.

In addition, the electronic device is configured to change the first time code if the operation time exceeds a total detection time obtained by summing a first detection time for a first code and a second detection time for a second code.

In addition, the electronic device is configured to insert the detection sequence into the first time code if a time obtained by subtracting an elapsed time obtained by detecting the second object from the operation time is the same as the first detection time.

In addition, the electronic device is configured to simultaneously store the at least one first object and the at least one second object and output the same.

In addition, the electronic device is configured to preprocess the time code set.

In addition, the electronic device is configured to check a total time of the time code set and the total detection time.

In addition, the electronic device is configured to set a number of repetitions of the first code and the second code such that the total detection time is equal to or greater than a threshold of the total time.

In addition, the electronic device is configured to check the first detection time for the first code to which frequency domain coding is not applied, and check the second detection time for the second code to which frequency domain coding and time domain coding are applied.

Furthermore, an object detection method in an object detection system comprising an electronic device and a plurality of ultrasonic sensors according to an embodiment of the present disclosure includes checking whether a detection sequence for detecting at least one first object is inserted into a first time code to be performed after a current time point among a plurality of time codes constituting a predetermined time code set for transmitting ultrasonic waves; inserting the detection sequence into the first time code according to whether the detection sequence is inserted; and detecting the at least one first object located outside a vehicle based on detecting data received from the ultrasonic sensor according to the detection sequence.

In addition, the method further includes, after checking whether the detection sequence is inserted, detecting at least one second object located farther than the first object based on detecting data received from the ultrasonic sensor.

In addition, the step of checking whether the detection sequence is inserted includes checking an operation time allocated to the first time code, and comparing a total detection time obtained by summing a first detection time for a first code and a second detection time for a second code with the operation time.

In addition, the step of checking an operation time allocated to the first time code is a step of determining that the first time code needs to be changed if the operation time is equal to or greater than a predetermined threshold time.

In addition, the step of comparing the total detection time and the operation time is a step of determining that the first time code needs to be changed if the operation time exceeds the total detection time.

In addition, the step of inserting the detection sequence is a step of inserting the detection sequence into the first time code if a time obtained by subtracting an elapsed time from the operation time is the same as the first detection time.

In addition, the method further includes, after detecting the at least one first object, storing the at least one first object and the at least one second object at the same time, and outputting the stored at least one first object and the at least one second object.

In addition, the method further includes, before checking whether the detection sequence is inserted, pre-processing the time code set.

In addition, the step of pre-processing the time code set includes checking a total time of the time code set, checking the total detection time, and setting a number of repetitions of the first code and the second code such that the total detection time is equal to or greater than a threshold of the total time.

In addition, the method further includes, after checking the total time, checking the first detection time for the first code to which frequency domain coding is not applied, and checking the second detection time for the second code to which frequency domain coding and time domain coding are applied.

Advantageous Effects

As described above, the object detection system and method using the ultrasonic sensor according to the present disclosure can expand the detection area of the ultrasonic sensor without deteriorating the detection continuity of the object and delaying the initial object detection time.

DETAILED DESCRIPTION OF THE EMBODIMENTS

Embodiments of the present disclosure are provided to describe the present disclosure more fully to those skilled in the art, the embodiments described below can be modified into various other forms, and the scope of the present disclosure is not limited to the following embodiments. Rather, these embodiments make the present disclosure more meaningful and complete and are provided for fully conveying the concept of the present disclosure to those skilled in the art.

The terms used in this specification are for the purpose of describing particular embodiments only and are not intended to limit the present disclosure. As used herein, the singular forms are intended to include the plural forms as well, unless the context clearly indicates otherwise. In addition, the terms "comprise" and/or "comprising," when used in this specification, specify the presence of stated shapes, integers, steps, operations, members, elements, and/or a group thereof but do not preclude the presence or addition of one or more other shapes, integers, steps, operations, members, elements, and/or groups thereof. As used herein, the term "and/or" includes any one of and all combinations of one or more of the relevant listed items.

Hereinafter, the embodiments of the present disclosure are described with reference to the drawings schematically illustrating the embodiments of the present disclosure. In the drawings, for example, variations in the illustrated shape may be expected depending on manufacturing techniques and/or tolerances. Accordingly, the embodiments of the present disclosure should not be construed as being limited to any particular shape of the regions illustrated herein and should include, for example, variations in shape resulting from manufacturing.

Figure 1:
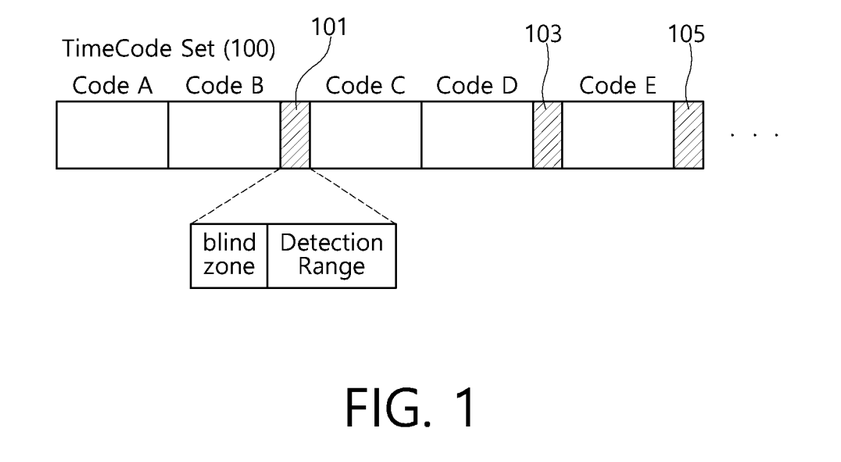
FIG. 1 is a diagram for describing a short-range object detection method according to a related art.

FIG. 1 is a diagram for describing a short-range object detection method according to a related art.

Referring to FIG. 1, conventionally, a detection algorithm in which time domain coding and frequency domain coding are combined was used to improve signal interference, shortage of maximum detection distance, excessive detection cycle time, and the like, which are great problems in detecting an object using an ultrasonic sensor. Accordingly, the above-described problems have been improved, but as the frequency domain coding is applied, a larger number of driving pulses are needed compared to the related art, and thus a blind zone has been increased.

To improve this, as shown in FIG. 1, while each of the plurality of time codes (codeA to codeE) constituting the time code set 100 is being executed, the operation of the time codes is stopped and short-range sequences 101, 103, and 105 are performed to detect a short-range object. For example, conventionally, the operation is stopped while codeB is being performed, and the short-range sequence 101 is performed, and when the operation of the short-range sequence 101 is finished, codeB is performed again or the operation of codeC is performed. In addition, the operation is stopped while codeD is being performed, and the short-range sequence 103 is performed, and when the operation of the short-range sequence 103 is finished, codeD is performed again or the operation of codeE is performed.

However, even in this case, the execution of the continuously operated codeB and codeD is stopped by performing the short-range sequences 101 and 103 after or during the completion of the execution of the codeB and codeD. Accordingly, there is a problem that the continuity of object detection is lowered, and a problem that the initial object detection time is delayed.

Figure 2:
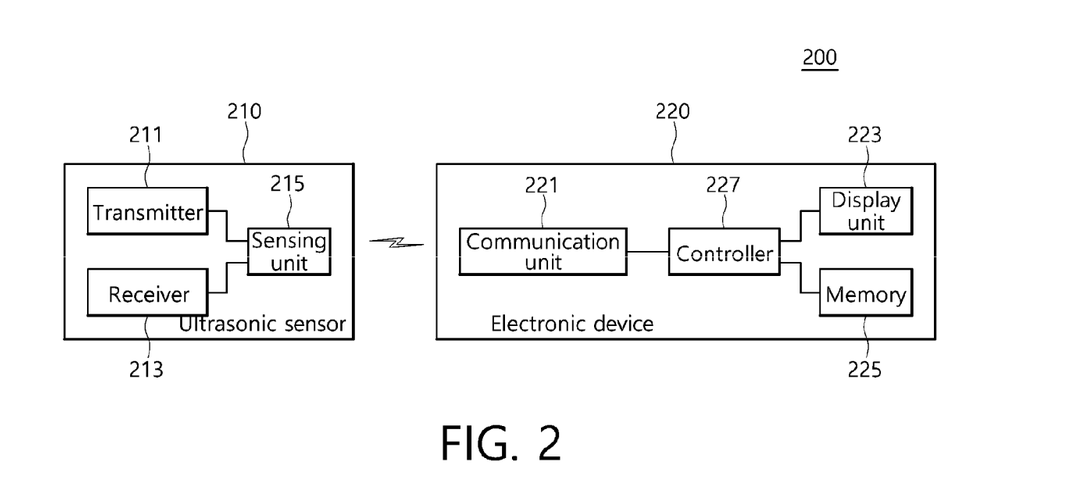
FIG. 2 is a diagram showing a main configuration of an object detection system using an ultrasonic sensor according to an embodiment of the present disclosure.

FIG. 2 is a diagram showing a main configuration of an object detection system using an ultrasonic sensor according to an embodiment of the present disclosure.

Referring to FIG. 2, the object detection system 200 according to the present disclosure may include an ultrasonic sensor 210 and an electronic device 220. The ultrasonic sensor 210 may include a transmitter 211, a receiver 213, and a sensing unit 215, and the electronic device 220 may include a communication unit 221, a display unit 223, a memory 225, and a controller 227.

A plurality of ultrasonic sensors 210 may be provided in a vehicle (not shown) and may transmit an ultrasonic signal to detect whether an object located outside the vehicle is present. To this end, the ultrasonic sensor 210 may include a transmitter 211 that transmits an ultrasonic signal corresponding to a predetermined frequency band to the outside the vehicle and a receiver 213 that receives a reflection signal reflected by an object outside the vehicle. In addition, the ultrasonic sensor 210 may include a sensing unit 215 that measures a distance between the vehicle and the object based on the reflection signal.

The electronic device 220 may be provided inside the vehicle (not shown) to perform communication with the ultrasonic sensor 210 to detect an object located outside the vehicle.

The communication unit 221 may receive a measured distance between the vehicle and the object measured by the sensing unit 215 through communication with the ultrasonic sensor 210 and provide the measured distance to the controller 227. To this end, the communication unit 221 may perform wireless communication such as Bluetooth, Bluetooth low energy (BLE), near field communication (NFC), zigbee, and the like with the ultrasonic sensor 210, and may perform serial communication such as RS-232.

The display unit 223 displays display data related to an operation performed in the electronic device 220. The display unit 223 includes a liquid crystal display (LCD), a light emitting diode (LED) display, an organic light emitting diode (OLED) display, a micro electro mechanical systems (MEMS) display, and an electronic paper display. The display unit 223 may be implemented as a touch screen capable of input.

The memory 225 stores an operation program for operation in the electronic device 220. The memory 225 may store a time code set composed of a plurality of time codes serving as references for an ultrasonic transmission period. In this case, different operation times may be allocated to each of the plurality of time codes. An algorithm for detecting an object located outside the vehicle, for example, a short-range object and a long-range object may be stored. In addition, the memory 225 may store a detection result for the short-range object and the long-range object.

The controller 227 performs pre-processing of the time code set when the vehicle is changed to a mode requiring detection of an object located outside the vehicle. In this case, the mode requiring detection of an object may be an autonomous driving mode, a parking mode, and the like. More specifically, the controller 227 checks the total time allocated to the time code set. In this case, the time code set may mean a set composed of a plurality of time codes set for ultrasonic transmission, and the time code may mean a period during which ultrasonic waves for detecting an object located outside the vehicle are transmitted. In addition, an operation time allocated to each time code may be randomly set and may be set according to a predetermined rule.

The controller 227 checks a first detection time for a first code and a second detection time for a second code. In this case, the first code is a code to which frequency domain coding is not applied, and may mean a code to which the first detection time for detecting a short-range object among objects located outside the vehicle is allocated. In this case, the second code is a code in which frequency domain coding and time domain coding are combined, and may mean a code to which the second detection time for detecting a long-range object among objects located outside the vehicle is allocated.

The controller 227 checks the total detection time obtained by adding the first detection time and the second detection time, and sets the number of repetitions of the first code and the second code such that the checked total detection time is equal to or greater than a threshold of the total time of the time code set, for example, equal to or greater than 50%. That is, since the time code set may be changed according to the mode of the vehicle, the number of repetitions of the first code and the second code may be changed.

When the pre-processing of the time code set is completed, the controller 227 performs detection of an object located outside the vehicle. To this end, the controller 227 checks whether a change of a time code, for example, the first time code, to be performed after the current time point is required. In this case, the change of the first time code may mean inserting the first code into the first time code. The controller 227 may determine that the first time code needs to be changed if the operation time allocated to the first time code is equal to or greater than the threshold time. In this case, the threshold time may be set based on the number of repetitions of the first code and the second code set in the pre-processing of the time code set.

If the operation time allocated to the first time code is equal to or greater than the threshold time, the controller 227 checks whether the operation time allocated to the first time code exceeds the total detection time obtained by summing the first detection time and the second detection time. As a result of the check, if the operation time allocated to the first time code is less than the threshold time or the operation time allocated to the first time code does not exceed the total detection time, the controller 227 may detect a second object, which is a long-range object outside the vehicle, using only the second code.

On the contrary, if the operation time allocated to the first time code is greater than the threshold time and the operation time allocated to the first time code exceeds the total detection time, the controller 227 performs the first time code. In this case, the controller 227 detects the second object outside the vehicle by using the second code, and checks whether the time obtained by subtracting the time for detecting the second object, for example, the elapsed time, from the operation time allocated to the first time code, is equal to the first detection time.

As a result of the check, if the time obtained by subtracting the elapsed time from the operation time allocated to the first time code is the same as the first detection time, the controller 227 calls a detection sequence (hereinafter referred to as a short-range sequence) and inserts it into the first time code. The controller 227 performs detection of a first object, which is a short-range object located outside the vehicle, by using the inserted short-range sequence. In this case, the short-range sequence may be the same code as the first code.

Subsequently, the controller 227 simultaneously stores a result of detecting a long-range object or a short-range object in the memory 225 and continuously outputs the result to the display unit 223. The controller 227 checks whether the detection of the object located outside the vehicle is ended. That is, when a mode in which an object located outside the vehicle needs to be detected is ended, the controller 227 may end the corresponding operation.

Figure 3:
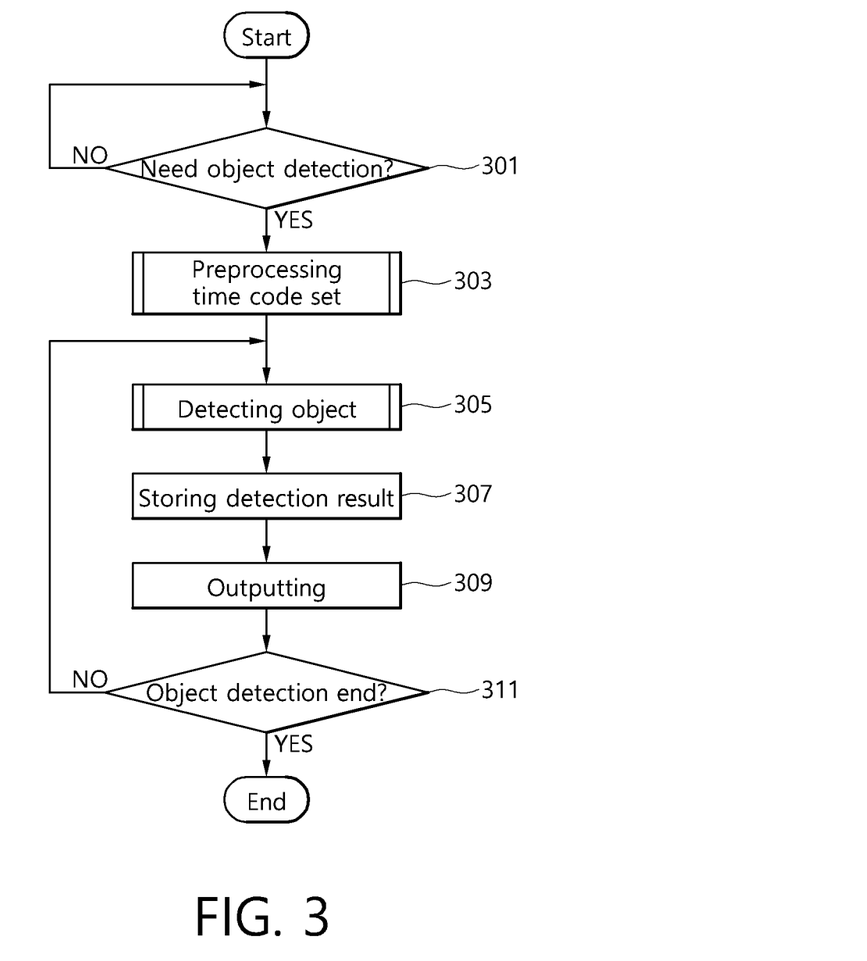
FIG. 3 is a flowchart for describing an object detection method using an ultrasonic sensor according to an embodiment of the present disclosure.

FIG. 3 is a flowchart for describing an object detection method using an ultrasonic sensor according to an embodiment of the present disclosure.

Referring to FIG. 3, in step 301, the controller 227 of the electronic device 220 checks whether it is necessary to detect an object located outside the vehicle. As a result of the checking in step 301, if object detection is required, the controller 227 performs step 303, and if object detection is not required, the controller 227 continuously checks whether object detection is necessary. In this case, whether object detection is necessary may be confirmed based on the change of the vehicle to the autonomous driving mode, the parking mode, and the like.

Figure 4:
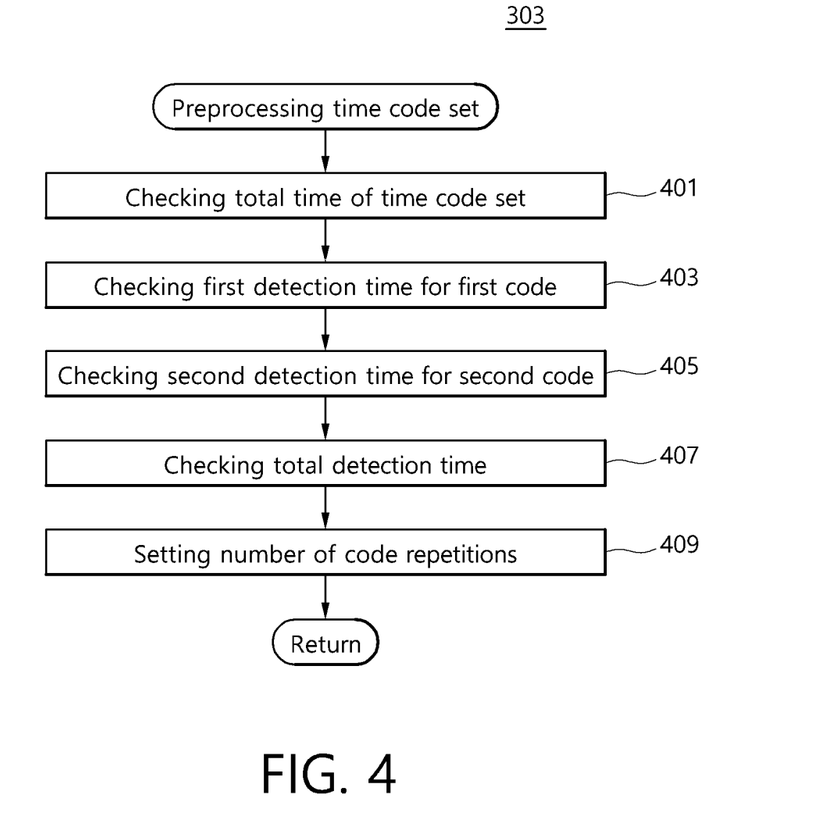
FIG. 4 is a detailed flowchart for describing a time code pre-processing method for detecting an object according to an embodiment of the present disclosure.

In step 303, the controller 227 performs pre-processing of the time code set. The pre-processing of the time code set will be described in more detail with reference to FIG. 4 below. FIG. 4 is a detailed flowchart for describing a time code pre-processing method for detecting an object according to an embodiment of the present disclosure.

Referring to FIG. 4, in step 401, the controller 227 checks the total time of the time code set. In this case, the time code set may mean a set composed of a plurality of time codes set for ultrasonic transmission, and the time code may mean a period during which ultrasonic waves for detecting an object located outside the vehicle are transmitted. In addition, an operation time allocated to each time code may be randomly set and may be set according to a predetermined rule.

In step 403, the controller 227 checks a first detection time for the first code, and in step 405, the controller 227 checks a second detection time for the second code. In this case, the first code is a code to which frequency domain coding is not applied, and may mean a code to which the first detection time for detecting a first object, which is a short-range object, among objects located outside the vehicle, is allocated. In this case, the second code is a code in which frequency domain coding and time domain coding are combined, and may mean a code to which the second detection time for detecting a second object, which is a long-range object, among objects located outside the vehicle, is allocated. As such, the present disclosure may use a detection algorithm in which a first code for detecting a short-range object is additionally combined with a second code in which frequency domain coding and time domain coding for detecting a long-range object are combined.

Then, in step 407, the controller 227 checks the total detection time obtained by adding the first detection time and the second detection time, and performs step 409. In step 409, the controller 227 sets the number of repetitions of the first code and the second code so that the total detection time is equal to or greater than the threshold of the total time of the time code set and returns to step 305 of FIG. 3. Through this, the present disclosure can improve the probability of detecting an object.

Figure 5:
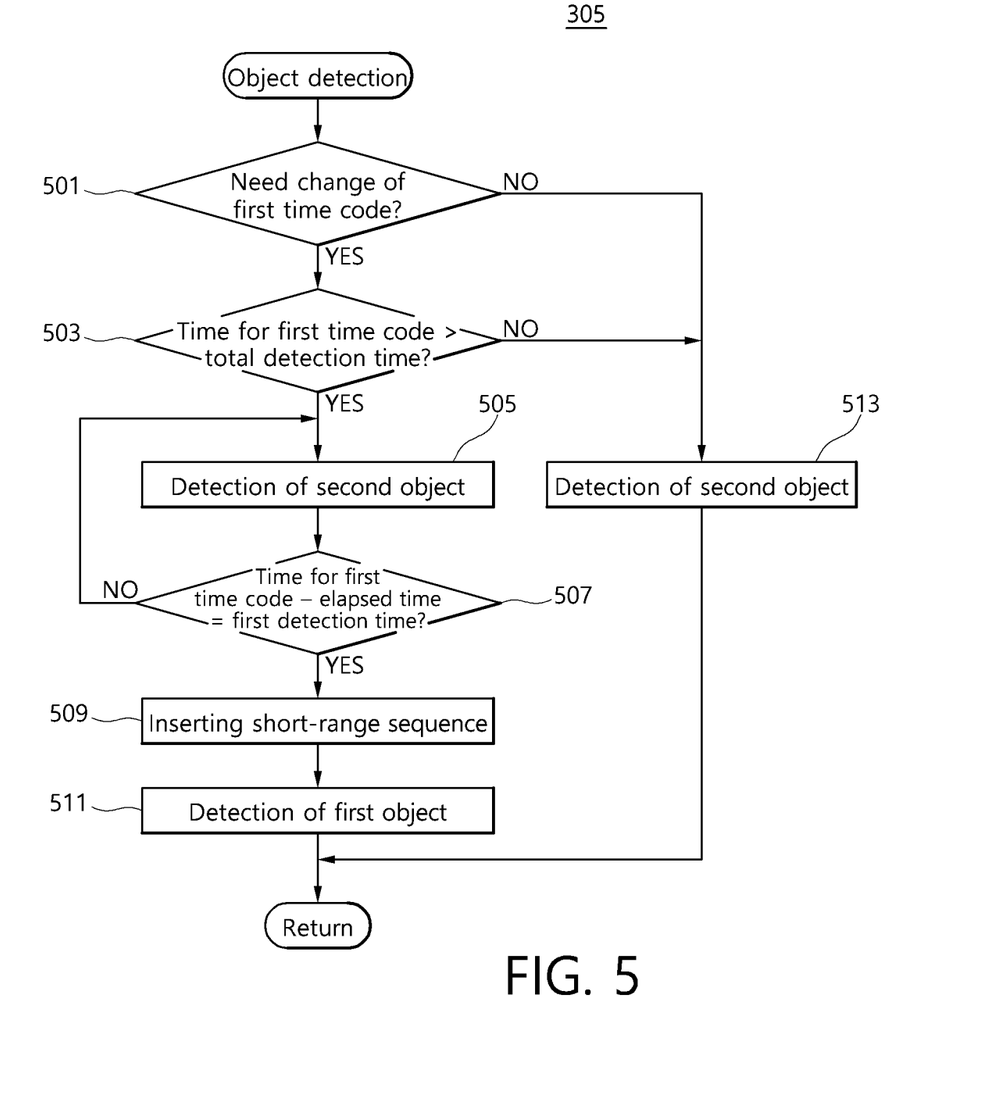
FIG. 5 is a detailed flowchart for describing an object detection method according to an embodiment of the present disclosure.

Then, in step 305, the controller 227 performs detection of an object. In this case, the detection of the object will be described in more detail with reference to FIG. 5 below. FIG. 5 is a detailed flowchart for describing an object detection method according to an embodiment of the present disclosure.

Referring to FIG. 5, in step 501, the controller 227 checks whether a time code needs to be changed. More specifically, the controller 227 may check whether a time code, for example, a first time code, to be performed after a current time point needs to be changed, and may determine that a first time code needs to be changed if an operation time allocated to the first time code is equal to or greater than a predetermined threshold time. In this case, the threshold time may be set based on the number of repetitions of the first code and the second code set in step 409 of FIG. 4. In step 501, if it is determined that the change of the first time code is required, the controller 227 performs step 503, and if it is determined that the change is not required, the controller 227 performs step 513. In step 513, the controller 227 may detect a second object located outside the vehicle using only the second code.

In step 503, the controller 227 checks whether the operation time allocated to the first time code exceeds the total detection time obtained by summing the first detection time and the second detection time. As a result of the checking in step 503, if the operation time allocated to the first time code exceeds the total detection time, the controller 227 performs step 505, otherwise performs step 513. In step 513, the controller 227 may detect a second object located outside the vehicle using only the second code.

In step 505, the controller 227 detects a second object located outside the vehicle by using the second code at an operation time allocated to the first time code. In step 507, the controller 227 checks whether the time obtained by subtracting the time for detecting the second object from the operation time allocated to the first time code, for example, the elapsed time, is equal to the first detection time. More specifically, the controller 227 continuously measures the elapsed time while performing the first time code, and performs step 509 if the subtracted time obtained by subtracting the elapsed time for performing the first time code from the operation time allocated to the first time code is equal to the first detection time. On the contrary, if the subtracted time is not equal to the first detection time, the controller 227 continuously performs step 505.

In step 509, the controller 227 calls a detection sequence (hereinafter, referred to as a short-range sequence) stored in the memory 225 and inserts it into the first time code, and in step 511, the controller 227 performs detection of a first object located outside the vehicle by using the inserted short-range sequence, and returns to step 307 of FIG. 3.

As such, the controller 227 may insert the short-range sequence into the first time code at the time point at which the subtracted time is equal to the first detection time, and continuously perform the short-range sequence identical to the first code and the second code in one time code, thereby solving the deterioration in continuity of object detection that occurs when detecting the first object and the second object. In addition, since the first object is detected by using the short-range sequence to which the frequency domain coding is not applied, it is possible to minimize the blind zone. In addition, the present disclosure can obtain a stable detection distance in a cramped environment or the like where an object is located close to the ultrasonic sensor 210 by minimizing a blind zone.

Then, in step 307, the controller 227 simultaneously stores the detection results of the second object detected in step 513 or the second object and the first object detected in steps 505 and 511 in the memory 225. In step 309, the controller 227 continuously outputs the first object and the second object stored in the memory 225. In step 311, the controller 227 checks whether the detection of the object located outside the vehicle is ended. As a result of the checking in step 311, if the object detection end is confirmed, the controller 227 may end the corresponding process, and if the object detection end is not confirmed, the controller 227 may resume the corresponding process by returning to step 305. In this case, the object detection end may be confirmed based on the end of the autonomous driving, parking mode, and the like of the vehicle.

Figure 6:
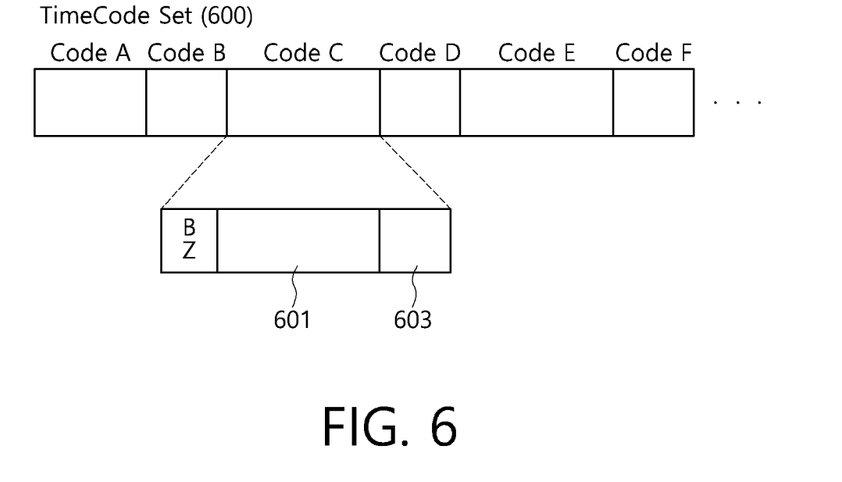
FIG. 6 is a diagram for describing an object detection method according to an embodiment of the present disclosure.

FIG. 6 is a diagram for describing an object detection method according to an embodiment of the present disclosure.

Referring to FIG. 6, a period in which ultrasonic waves are transmitted from the ultrasonic sensor 210 may be set like a plurality of time codes constituting the time code set 600. Since the operation time allocated to each of codeA and codeB is less than a predetermined threshold time, the controller 227 may independently drive the frequency domain coding and the time domain coding included in the second code to detect a long-range object located outside the vehicle.

The controller 227 may check whether a time code to be performed next, that is, codeC, which is the first time code, needs to be changed while codeB is being executed. If the operation time allocated to the codeC is equal to or greater than a predetermined threshold time, the controller 227 may determine that the codeC needs to be changed. Subsequently, the controller 227 checks whether the operation time allocated to the codeC exceeds the total detection time obtained by summing the first detection time and the second detection time, and if the operation time allocated to the codeC exceeds the total detection time, the controller 227 performs an operation based on the codeC.

The controller 227 measures the elapsed time when the operation is continuously performed while performing the operation based on the codeC, that is, the long-range sequence 601 which is the second code. If the subtracted time obtained by subtracting the elapsed time from the operation time allocated to codeC is equal to the first detection time, the controller 227 calls the short-range sequence 603, which is the first code, and inserts it into codeC so that the second code and the first code are continuously performed in codeC.

Then, if the operation time allocated to codeD does not exceed the total detection time, the controller 227 may perform codeD using the second code and check whether codeE to be performed next needs to be changed while codeD is being executed. As described above, the controller 227 can check whether a change is necessary for each of a plurality of time codes constituting the time code set and, if necessary, can operate by inserting a short-range sequence into the corresponding time code.

The embodiments of the present disclosure disclosed in the present specification and drawings are only provided as specific examples to easily describe the technical content of the present disclosure and to aid understanding of the present disclosure, and are not intended to limit the scope of the present disclosure. Therefore, the scope of the present disclosure should be construed that all changes or modifications derived based on the technical idea of the present disclosure in addition to the embodiments disclosed herein are included in the scope of the present disclosure.

What is claimed is:

1. An object detection system comprising:
    a plurality of ultrasonic sensors comprising a transmitter and a receiver and each having a detection area; and
    an electronic device comprising a controller configured to process data, and a communication unit configured to perform data communication;
    wherein the plurality of ultrasonic sensors are configured to transmit ultrasonic waves to an outside of a vehicle; and
    the electronic device is configured to insert a detection sequence for detecting at least one first object into a first time code to be performed after a current time point among a plurality of time codes constituting a predetermined time code set for transmitting ultrasonic waves, and detect the at least one first object located outside the vehicle based on detecting data received from the plurality of ultrasonic sensors according to the detection sequence.

2. The object detection system of claim 1, wherein the electronic device is configured to detect at least one second object located farther than the first object based on detecting data received from the plurality of ultrasonic sensors.

3. The object detection system of claim 2, wherein the electronic device is configured to change the first time code if an operation time allocated to the first time code is equal to or greater than a threshold time.

4. The object detection system of claim 3, wherein the electronic device is configured to change the first time code if the operation time exceeds a total detection time obtained by summing a first detection time for a first code and a second detection time for a second code.

5. The object detection system of claim 4, wherein the electronic device is configured to insert the detection sequence into the first time code if a time obtained by subtracting an elapsed time obtained by detecting the second object from the operation time is the same as the first detection time.

6. The object detection system of claim 5, wherein the electronic device is configured to simultaneously store the at least one first object and the at least one second object and output the same.

7. The object detection system of claim 4, wherein the electronic device is configured to pre-process the time code set.

8. The object detection system of claim 7, wherein the electronic device is configured to check a total time of the time code set and the total detection time.

9. The object detection system of claim 8, wherein the electronic device is configured to set a number of repetitions of the first code and the second code such that the total detection time is equal to or greater than a threshold of the total time.

10. The object detection system of claim 9, wherein the electronic device is configured to check the first detection time for the first code to which frequency domain coding is not applied, and check the second detection time for the second code to which frequency domain coding and time domain coding are applied.

11. An object detection method in an object detection system comprising an electronic device and a plurality of ultrasonic sensors, the method comprising:
    checking whether a detection sequence for detecting at least one first object is inserted into a first time code to be performed after a current time point among a plurality of time codes constituting a predetermined time code set for transmitting ultrasonic waves;
    inserting the detection sequence into the first time code according to whether the detection sequence is inserted; and
    detecting the at least one first object located outside a vehicle based on detecting data received from the plurality of ultrasonic sensors according to the detection sequence.

12. The object detection method of claim 11, further comprising:
    after checking whether the detection sequence is inserted, detecting at least one second object located farther than the first object based on detecting data received from the plurality of ultrasonic sensors.

13. The object detection method of claim 12, wherein the step of checking whether the detection sequence is inserted comprises:
    checking an operation time allocated to the first time code; and
    comparing a total detection time obtained by summing a first detection time for a first code and a second detection time for a second code with the operation time.

14. The object detection method of claim 13, wherein the step of checking an operation time allocated to the first time code is a step of determining that the first time code needs to be changed if the operation time is equal to or greater than a predetermined threshold time.

15. The object detection method of claim 14, wherein the step of comparing the total detection time and the operation time is a step of determining that the first time code needs to be changed if the operation time exceeds the total detection time.

16. The object detection method of claim 15, wherein the step of inserting the detection sequence is a step of inserting the detection sequence into the first time code if a time obtained by subtracting an elapsed time from the operation time is the same as the first detection time.

17. The object detection method of claim 12, further comprising:
   after detecting the at least one first object,
   storing the at least one first object and the at least one second object at the same time; and
   outputting the stored at least one first object and the at least one second object.

18. The object detection method of claim 14, further comprising:
   before checking whether the detection sequence is inserted, pre-processing the time code set.

19. The object detection method of claim 18, wherein the step of pre-processing the time code set comprises:
   checking a total time of the time code set;
   checking the total detection time; and
   setting a number of repetitions of the first code and the second code such that the total detection time is equal to or greater than a threshold of the total time.

20. The object detection method of claim 19, further comprising:
   after checking the total time,
   checking the first detection time for the first code to which frequency domain coding is not applied; and
   checking the second detection time for the second code to which frequency domain coding and time domain coding are applied.

* * * * *